US008756604B2

(12) United States Patent
Paperin et al.

(10) Patent No.: US 8,756,604 B2
(45) Date of Patent: Jun. 17, 2014

(54) ASYNC WRAPPER HANDLING EXECUTION OF ASYNCHRONOUS OPERATIONS FOR SYNCHRONOUS AND ASYNCHRONOUS ROUTINES

(75) Inventors: Gregory Paperin, Redmond, WA (US); Eric L. Eilebrecht, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 203 days.

(21) Appl. No.: 13/324,881

(22) Filed: Dec. 13, 2011

(65) Prior Publication Data

US 2013/0152104 A1    Jun. 13, 2013

(51) Int. Cl.
  *G06F 9/455*  (2006.01)
  *G06F 9/46*  (2006.01)
(52) U.S. Cl.
  USPC .......................................... 718/102; 718/100
(58) Field of Classification Search
  None
  See application file for complete search history.

(56) References Cited

U.S. PATENT DOCUMENTS

| 7,248,603 | B1 | 7/2007 | Grunkemeyer et al. | |
|---|---|---|---|---|
| 2003/0065709 | A1* | 4/2003 | Jordan et al. | 709/202 |
| 2009/0199202 | A1* | 8/2009 | Molnar | 719/313 |
| 2009/0235259 | A1 | 9/2009 | Manoj et al. | |
| 2009/0293073 | A1 | 11/2009 | Nathan et al. | |

OTHER PUBLICATIONS

Richter, Jeffrey, "Implementing the CLR Asynchronous Programming Model", In Proceedings of MSDN Magazine, Mar. 2007, 8 pages.
"TPL and Traditional .Net Asynchronous Programming", Retrieved on: Sep. 29, 2011, Available at: msdn.microsoft.com/en-us/library/dd997423.aspx.
"Wrapping Instrumentation Drivers", Retrieved on: Sep. 29, 2011, Available at: uaview.esi-cit.com/datalog_wrapping_drivers.html.
Richter, Dave, "The C# Asynchronous Programming Model", Retrieved on: Sep. 29, 2011, Available at: c-sharpcorner.com/UploadFile/logisimo/107252009003250AM/1.aspx.
Fong, Pamela, "Asynchronous Processing in WebSphere Process Server", Published on: Apr. 29, 2009, Available at: ibm.com/developerworks/websphere/library/techarticles/0904_fong/0904_fong.html.

\* cited by examiner

*Primary Examiner* — Meng An
*Assistant Examiner* — Bradley Teets
(74) *Attorney, Agent, or Firm* — Kevin Sullivan; Raghu Chinagudabha; Micky Minhas

(57) ABSTRACT

The present invention extends to methods, systems, and computer program products for handling synchronous operations by means of asynchronous operations. Upon completion of an asynchronous operation, a state flag is accessed. The state flag indicates whether or not a sync-over-async wrapper/adapter requested execution of the asynchronous operation. The sync-over-async wrapper/adapter is currently blocked awaiting notice of completion of the asynchronous operation. Based on the state flag, results of the asynchronous operation are stored at a location accessible by the sync-over-async wrapper. A completion signal is sent to the sync-over-async wrapper.

15 Claims, 3 Drawing Sheets

ASYNC WRAPPER HANDLING EXECUTION OF ASYNCHRONOUS OPERATIONS FOR SYNCHRONOUS AND ASYNCHRONOUS ROUTINES

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

Many computing environments and code routines are configured to execute software code synchronously. Using synchronous execution techniques, a calling context (e.g., routine, thread, etc.) blocks (or suspends execution) while a requested operation executes. The calling context resumes only after the operation completes. Upon completion, the requested operation may return execution results to the calling context. The calling context may, in turn, use the execution results in any appropriate manner.

Because calling contexts cannot perform any work while blocked, blocking can lead to significant performance issues for the calling context and for any code relying on the calling context. As such, calling contexts may be unable to perform any work during extended periods of time if the requested operation takes a relatively long amount of time to execute. Calling contexts may also remain blocked for unbounded periods of time if the requested operation exhibits unbounded execution times. Operations commonly exhibiting long execution times and/or unbounded execution times may include data processing operations and input/output ("I/O") operations.

Other computing environments are configured to execute operations asynchronously with their calling context. Using asynchronous execution techniques, a calling context continues to execute in one thread while a requested operation executes in another thread. Thus, asynchronous execution techniques enable both the calling context and a requested operation to execute in parallel on separate threads. When an operation that was started asynchronously completes, it marshals execution results to the calling context. Marshalling execution results may include communicating the results to data structures of the calling context.

Asynchronous execution techniques therefore overcome one or more performance issues associated with synchronous execution techniques by enabling calling contexts to continue executing in one thread, while long executing or unbounded operations execute in another thread.

In some situations, it may be desirable for code configured to block after calling an operation (e.g., synchronous routines) to call operations configured to execute asynchronously (e.g., asynchronous operations). For example, a code routine unaware of asynchronous techniques may need to call an asynchronous I/O operation, or the code routine may need results of the asynchronous I/O operation before it can do further work. At least one mechanism accommodates such calls by encapsulating asynchronous operations within 'sync wrappers'. When called by a synchronous routine, a sync wrapper executes a corresponding asynchronous operation on a different thread and then blocks until the asynchronous operation signals its completion. Blocking by the async wrapper, in turn, blocks the synchronous routine (and its thread) during execution of the asynchronous operation. This technique can also be referred to by terms including, but not limited to, 'sync adapter', 'sync-over-async pattern', or similar.

In some threading models, data structures used by a thread are accessible to only that thread. In these threading models, an asynchronous operation executing within a sync wrapper on one thread may therefore be unable to marshal results to data structures of its calling routine. This is because the calling routine is blocked on another thread, and only that routine can access the data structures, or because the blocked thread is required to execute some instructions in order to get results marshaled into it.

BRIEF SUMMARY

The present invention extends to methods, systems, and computer program products for handling of synchronous operations realized by means of asynchronous operations.

In some embodiments, a state flag is accessed in response to detecting completion of an asynchronous operation. The state flag indicates whether or not a sync-over-async wrapper (or adapter) requested execution of the asynchronous operation, the sync-over-async wrapper being currently blocked awaiting notice of completion of the asynchronous operation. Based on the state flag, results of the asynchronous operation are stored at a location accessible by the sync-over-async wrapper, and a completion signal is sent to the sync-over-async wrapper.

In other embodiments, execution of an asynchronous operation is requested. The request includes a state flag indicating that execution of the asynchronous operation is requested on behalf of a thread configured to block awaiting completion of the asynchronous operation. The requesting thread is blocked pending execution of the asynchronous operation. Subsequent to blocking the requesting thread, notice indicating that the asynchronous operation has completed execution is received. In response to the notice, the requesting thread is unblocked. Then, results of the asynchronous operation are fetched from a storage location. The storage location was previously used by a completion handler for the asynchronous operation to store the results of the asynchronous operation. The results were stored by the asynchronous operation subsequent to the asynchronous operation completing.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
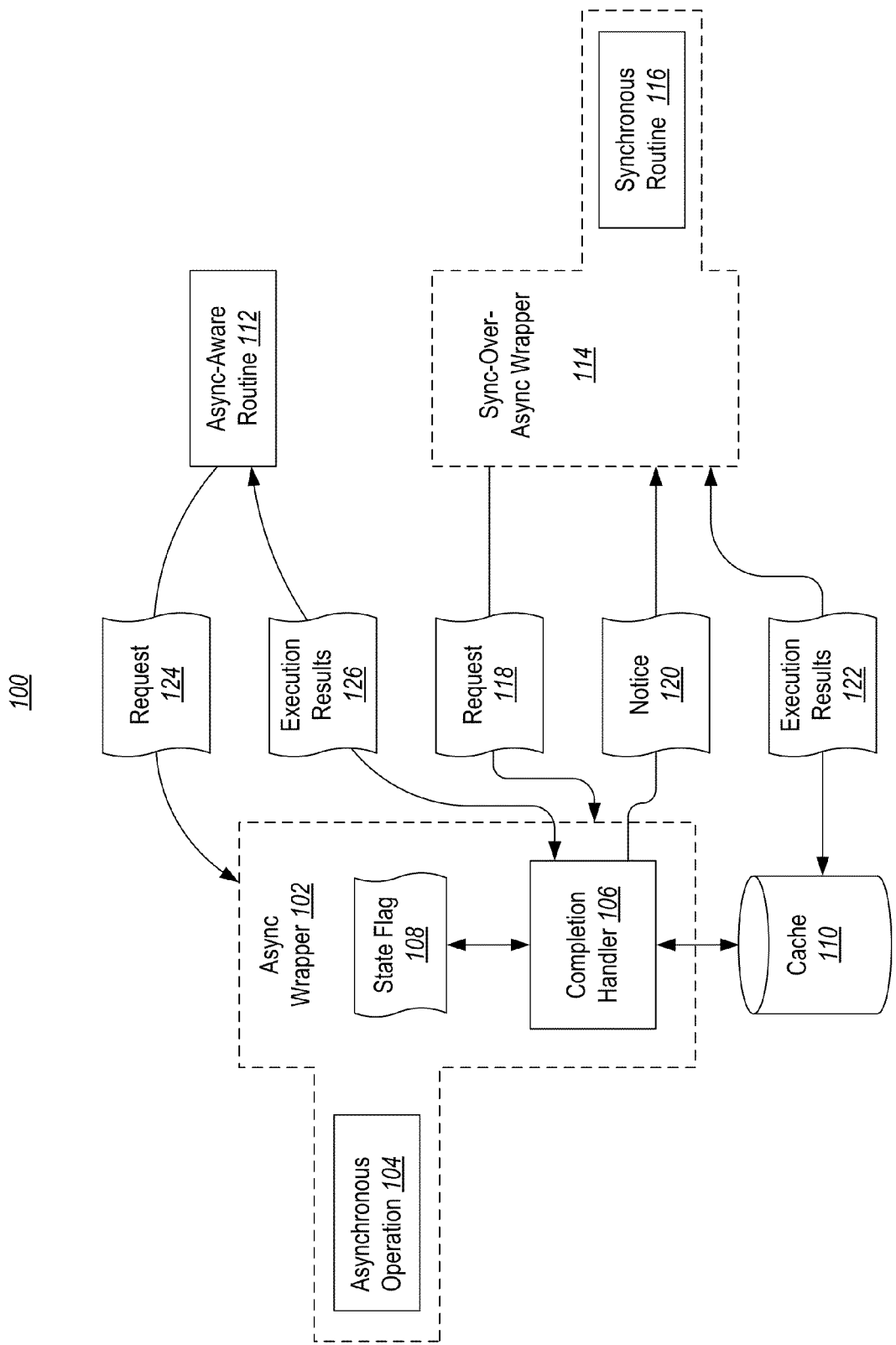
FIG. 1 illustrates an example computer architecture that facilitates handling the completion of asynchronous operations called from synchronous routines.

The present invention extends to methods, systems, and computer program products for handling of synchronous operations realized by means of asynchronous operations.

In some embodiments, a state flag is accessed in response to detecting completion of an asynchronous operation. The state flag indicates whether or not a sync-over-async wrapper (or adapter) requested execution of the asynchronous operation, the sync-over-async wrapper being currently blocked awaiting notice of completion of the asynchronous operation. Based on the state flag, results of the asynchronous operation are stored at a location accessible by the sync-over-async wrapper, and a completion signal is sent to the sync-over-async wrapper.

In other embodiments, execution of an asynchronous operation is requested. The request includes a state flag indicating that execution of the asynchronous operation is requested on behalf of a thread configured to block awaiting completion of the asynchronous operation. The requesting thread is blocked pending execution of the asynchronous operation. Subsequent to blocking the requesting thread, notice indicating that the asynchronous operation has completed execution is received. In response to the notice, the requesting thread is unblocked. Then, results of the asynchronous operation are fetched from a storage location. The storage location was previously used by a completion handler for the asynchronous operation to store the results of the asynchronous operation. The results were stored by the asynchronous operation subsequent to the asynchronous operation completing.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates handling the completion of asynchronous operations called from synchronous routines. Referring to FIG. 1, computer architecture 100 includes async wrapper 102, asynchronous operation 104, async-aware routine 112, sync-over-async wrapper 114 and synchronous routine 116. While each of the depicted components may be included a single computer system, these components can be distributed a plurality of computer systems that are connected to one another over a network, such as, for example, a Local Area Network ("LAN"), a Wide Area Network ("WAN"), and even the Internet.

As depicted, async wrapper 102 encloses asynchronous operation 104 and includes completion handler 106 and state flag 108. As such, async wrapper 102 supplements asynchronous operation 104 with functionality of completion handler 106 and state flag 108. While termed a "wrapper," async wrapper 102 represents any mechanism for supplementing or adding functionality to asynchronous operation 104. In some embodiments, async wrapper 102 comprises a library or adapter that encapsulates and/or calls asynchronous operation 104. In other embodiments, async wrapper 102 comprises one or more modifications to asynchronous operation 104 itself. Any mechanism for supplementing or adding functionality to asynchronous operation 104 falls within the scope of this disclosure.

Asynchronous operation 104 represents an operation or routine enabled to execute in parallel with a calling context. Asynchronous operation 104 may comprise one or more data processing tasks, one or more I/O operations, or any other appropriate functionality. When initiated by a calling context, asynchronous operation 104 executes in one or more threads thread while the calling context continues executing in threads different from the threads that execute asynchronous operation 104, or blocks in its thread. During execution, asynchronous operation 104 may generate execution results for the calling context.

In some circumstances, asynchronous operation 104 may be called truly asynchronously. For example, async-aware routine 112 may issue request 124, requesting initiation of asynchronous operation 104 in a truly asynchronous manner. Request 124 may be received by any appropriate component, such as async wrapper 102 (e.g., a library, a routine, an adapter, etc.) or by asynchronous operation 104 itself. Request 124 can include any appropriate data, such as data objects, pointers, flags, etc.

In some embodiments, for example, request 124 may include a pointer to memory where execution results 126 of asynchronous operation 104 are written upon completion of asynchronous operation 104. In other embodiments, request 124 may include a data object used to marshal execution results 126 to async-aware routine 112. In still other embodiments, request 124 may include identification of another thread and/or data structures associated with the other thread to which execution results 126 should be marshaled.

Request 124 may also include a state flag indicating that asynchronous operation 104 has been requested by a truly asynchronous routine. Subsequent to issuing request 124, async-aware routine 112 generally continues executing in parallel with asynchronous operation 104 on a separate thread.

In other circumstances, asynchronous operation 104 may be called synchronously via a sync-over-async wrapper. For example, at request of synchronous routine 116, sync-over-async wrapper 114 may issue request 118 on behalf of synchronous routine 116. Request 118 requests initiation of asynchronous operation 104. Request 118 may be received by any appropriate component, such as async wrapper 102 (e.g., a library, a routine, an adapter, etc.) or by asynchronous operation 104 itself. Request 118 can include any appropriate data objects, pointers, etc., such as those described above in the context of async-aware routine 112. In . particular, request 118 may include reference to one or more data objects or data structures accessible only while synchronous routine 116 is unblocked. For example, request 118 may reference data structures or objects that are local to synchronous routine 116 (e.g., stack-based variables, thread-unique variables, data that requires marshaling instructions executed on the synchronous routine's thread in order to be accessed from a different thread, etc.) or shared data structures only accessible when synchronous routine 116 is unblocked.

Request 118 may also include a state flag indicating that asynchronous operation 104 has been requested via sync-over-async wrapper 114. Subsequent to issuing request 118, synchronous routine 116 (and possibly sync-over-async wrapper 114) generally blocks pending execution of asynchronous operation 104.

While termed a "wrapper," sync-over-async wrapper 114 represents any mechanism for enabling synchronous routine 116 to call asynchronous operation 104 in a synchronous manner (i.e., any mechanism that allows synchronous routine 116 to block after calling asynchronous operation 104). In some embodiments, sync-over-async wrapper 114 comprises a library or adapter that encapsulates synchronous routine 116 (as depicted), or encapsulates asynchronous routine 104, or encapsulates async wrapper 102. In other embodiments, sync-over-async wrapper 114 comprises a library called by synchronous routine 116. Any mechanism for enabling synchronous routine 116 to call asynchronous operation 104 in a synchronous manner falls within the scope of this disclosure.

Completion handler 106 is configured to execute upon completion of asynchronous operation 104. When executed, completion handler 106 analyzes state flag 108 to ascertain the manner in which asynchronous operation 104 was called and, in turn, the expected state of the calling thread (i.e., blocked or active). In some embodiments, state flag 108 represents one of two states, such as 'true' or 'false'. In these embodiments state flag 108 may comprise a boolean variable (e.g., 'usedBySync'), but any mechanism for storing state may be used. State flag 108 may be set based on state flag information included in requests which caused execution of asynchronous operation (e.g., request 124 or request 118), or may be set based on inference about the type of calling context.

When state flag 108 stores a first state (e.g., when a 'usedBySync' or similar variable stores a 'false' value), completion handler 106 can determine that asynchronous operation 104 was called truly asynchronously. That is, asynchronous operation 104 was called by a context, such as async-aware routine 112, configured to initiate asynchronous operation 104 on a first thread or first set of threads, and to continue executing on a second thread or set of threads. Thus, completion handler 106 can infer that no code in the calling context is likely to be blocked waiting for execution results of asynchronous operation 104, and that execution results should be processed by the completion handler immediately.

As such, completion handler 106 can marshal execution results 126 to async-aware routine 112 (or any other appropriate routine). Because async-aware routine 112 is active, it can participate in the marshaling and any data structures should be available. The arrows associated with execution results 126 are two-sided, indicating that marshaling execution results 126 may involve two-way communications between async-aware routine 112 (or any other routine to which execution results 126 are being marshaled) and completion handler 106.

When state flag 108 stores a second state (e.g., when a 'usedBySync' or similar variable stores a 'true' value), completion handler 106 can determine that asynchronous operation 104 was called by a synchronous routine. For example, asynchronous operation 104 may have been called by synchronous routine 116 via sync-over-async wrapper 114. As such, synchronous routine 116 (and possibly sync-over-async wrapper 114) is likely blocked. When blocked, synchronous routine 116 cannot participate in the marshaling of execution results, and memory to which the execution results are to be marshaled may be inaccessible.

Thus, when state flag 108 stores the second state, completion handler 106 sends notice 120 to sync-over-async wrapper 114, notifying the wrapper that asynchronous operation 104 has completed. Completion handler 106 also causes any execution results to be stored at a location accessible to synchronous routine 116, such as at cache 110. Subsequent to sync-over-async wrapper 114 receiving notice 120, synchronous routine 116 unblocks. Synchronous routine 116 then fetches execution results 122 from cache 110. The arrows associated with execution results 122 are two-sided, indicating fetching the results may involve two-way communications between synchronous routine 116 and any appropriate component, such as asynchronous operation 104, cache 110, or completion handler 106. Also, while the arrows associated with execution results 122 interface directly with cache 110, it will be appreciated that fetching the results may involve indirect communication, such as through asynchronous operation.

While FIG. 1 depicts two wrappers (async wrapper 102 and sync-over-async wrapper 114), this is done for clarity in describing interaction between asynchronous operation 104 and synchronous routine 116. It will be appreciated that async wrapper 102 and sync-over-async wrapper 114 may, in some embodiments, be one-in-the-same or may be part of the same library, routine, or adapter. In such embodiments, routines (asynchronous and/or synchronous) may call a library/adapter to initiate execution of an asynchronous operation. The library/adapter may set a state flag as appropriate, initiate execution of the requested asynchronous operation, and cause the calling routine to block if it is synchronous. When the requested asynchronous operation completes, the library/adapter or the asynchronous routine may execute a completion handler to marshal results to the calling routine as appropriate, according to the state flag.

Regardless of whether multiple wrappers or a single wrapper are used, embodiments of the invention supplement an asynchronous operation with a completion handler and a state flag. Doing so enables the asynchronous operation to be called by both asynchronous and synchronous routines, and enables results of the asynchronous operation to be handled appropriately.

Figure 2A:
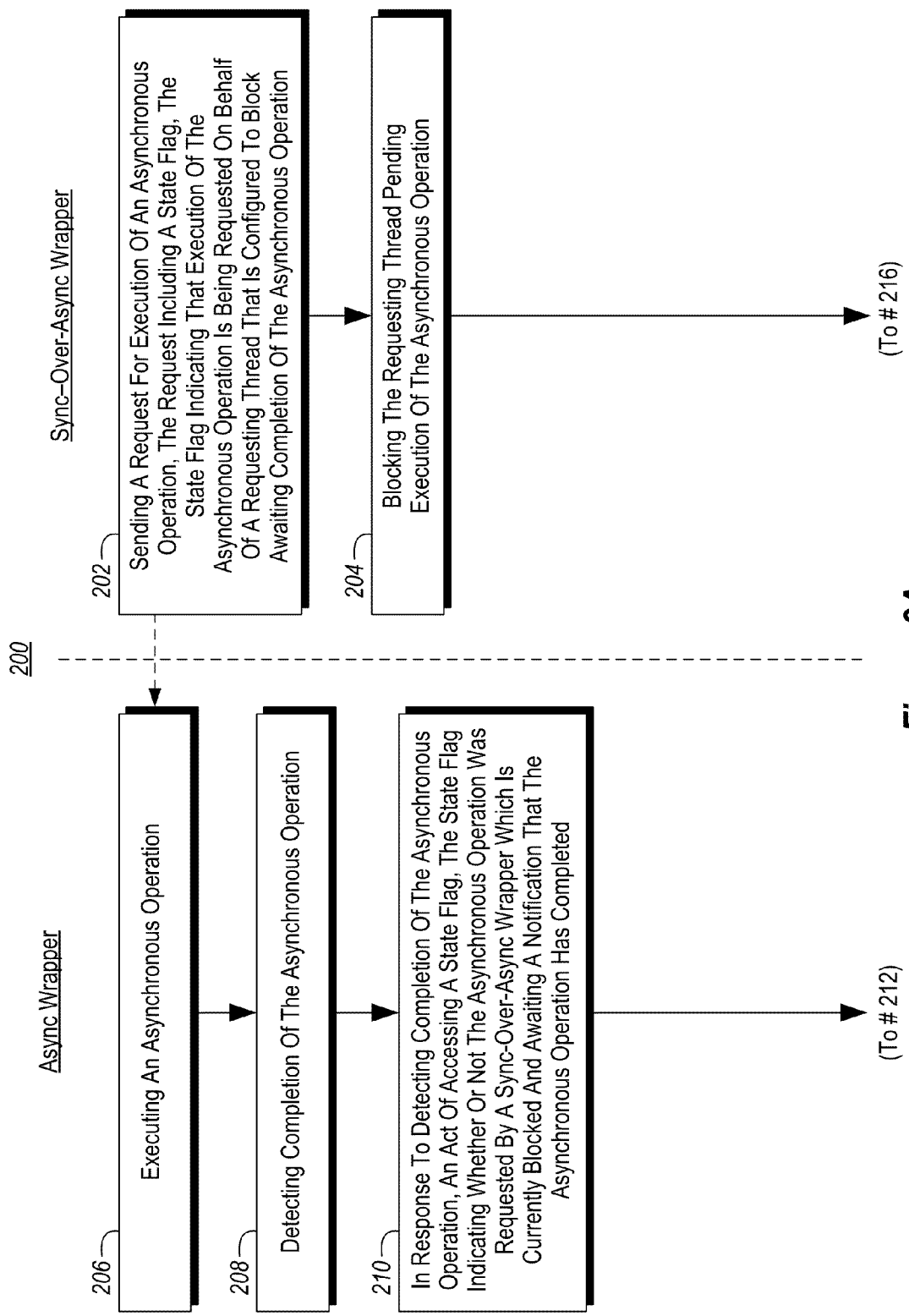
FIG. 2 illustrates a flow chart of an example method for executing an asynchronous operation from a synchronous routine and for handling completion of the asynchronous operation.
Figure 2B:
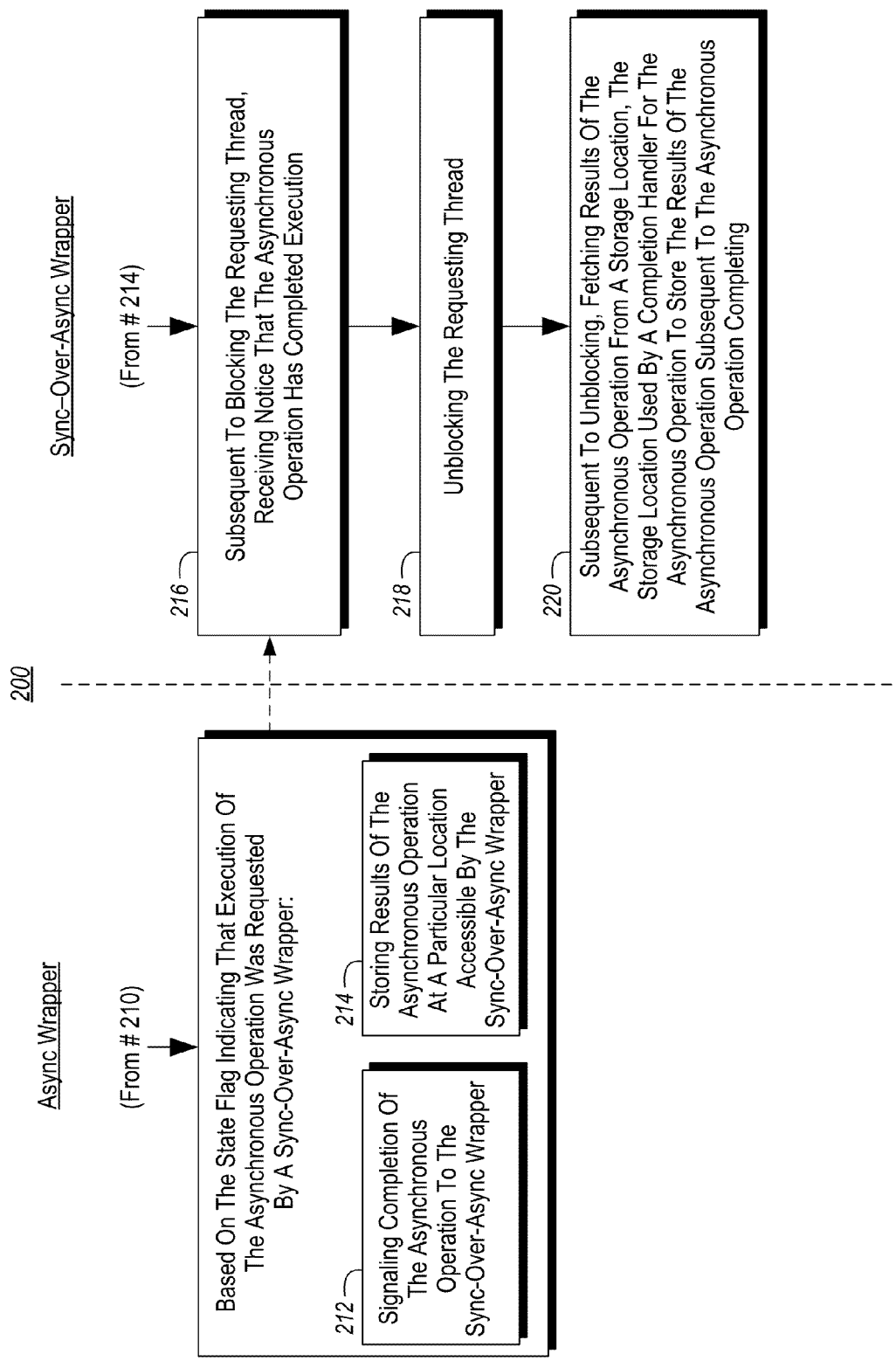

FIG. 2 illustrates a flow chart of an example method 200 for executing an asynchronous operation from a synchronous routine and for handling completion of the asynchronous operation, including acts performed both an async wrapper and a sync-over-async wrapper. Method 200 will be described with respect to the components and data of computer architecture 100.

Method 200 includes an act of an act of sending a request for execution of an asynchronous operation, the request including a state flag, the state flag indicating that execution of the asynchronous operation is being requested on behalf of a requesting thread that is configured to block awaiting completion of the asynchronous operation (act 202). For example, at the request of synchronous routine 116, sync-over-async wrapper 114 can send request 118 to async wrapper 102. Request 118 can comprise a request that asynchronous operation 104 be initiated on behalf of synchronous routine 116, along with any other appropriate information such as a state flag, a pointer to memory, a data structure or object, etc.

Method 200 also includes an act of blocking the requesting thread pending execution of the asynchronous operation (act 204). For example, after sending request 118 synchronous routine 116 can block pending execution of asynchronous operation. In some embodiments, sync-over-async wrapper 114 may also block.

Method 200 also includes an act executing an asynchronous operation (act 206). For example, in response to request 118 sent as part of act 202, async wrapper 102 can initiate execution of asynchronous operation 104. Async wrapper 102 can also set state flag 108, indicating that asynchronous operation 104 was initiated on behalf of a sync-over-async wrapper. State flag 108 may be set based on information contained in request 118, a type associated with request 118, the identity of synchronous routine 116 or sync-over-async wrapper 114, or any other appropriate mechanism.

Method 200 also includes an act of detecting completion of the asynchronous operation (act 208). For example, async wrapper 102 can determine that asynchronous operation 104 has completed. This may be in the form of a callback, a return from a method call, or any other appropriate mechanism.

Method 200 also includes, in response to detecting completion of the asynchronous operation, an act of accessing a state flag, the state flag indicating whether or not the asynchronous operation was requested by a sync-over-async wrapper (or adapter) which is currently blocked and awaiting a notification that the asynchronous operation has completed (act 210). For example, upon completion of asynchronous operation 104, completion handler 106 can execute. Completion handler 106 can analyze state flag 108 to ascertain the type of context that initiated execution of asynchronous operation 104.

For example, when state flag 108 comprises a boolean 'true', state flag 108 may indicate that execution of asynchronous operation 104 was initiated by a sync-over-async wrapper (e.g., sync-over-async wrapper 114) on behalf of a synchronous routine (e.g., synchronous routine 116), which is currently blocked and awaiting notice that the asynchronous operation 104 has completed. Alternatively, if state flag 108 were to comprise a boolean 'false', state flag 108 may indicate that execution of asynchronous operation 104 was initiated truly asynchronously (e.g., by async-aware routine 112). Of course, state flag 108 may store state in a variety of ways, and is not limited to the foregoing example.

Method 200 also includes, based on the state flag indicating that execution of the asynchronous operation was requested by a sync-over-async wrapper (or adapter), an act of storing results of the asynchronous operation at a particular location accessible by the sync-over-async wrapper (act 212). For example, when state flag 108 does indicate that execution of asynchronous operation 104 was initiated by a sync-over-async wrapper (e.g., a boolean 'true'), completion handler 106 can store execution results of asynchronous operation 104 in cache 110.

Method 200 also includes, based on the state flag indicating that execution of the asynchronous operation was requested by a sync-over-async wrapper (or adapter), an act of signaling completion of the asynchronous operation to the sync-over-async wrapper (act 214). For example, prior or subsequent to storing execution results of asynchronous operation 104 in cache 110, completion handler 106 can send notice 120 to sync-over-async wrapper 114.

Method 200 also includes, subsequent to blocking the requesting thread, an act of receiving notice that the asynchronous operation has completed execution (act 216). For example, sync-over-async wrapper 114 can receive notice 120 sent as part of act 214.

Method 200 also includes an act of unblocking the requesting thread (act 218). For example, in response to receiving notice 120, sync-over-async wrapper 114 can cause synchronous routine 116 to unblock. In embodiments when sync-over-async wrapper 114 blocks, sync-over-async wrapper 114 can also unblock.

Method 200 also includes, subsequent to unblocking, an act of fetching results of the asynchronous operation from a storage location, the storage location used by a completion handler for the asynchronous operation to store the results of the asynchronous operation subsequent to the asynchronous operation completing (act 220). For example, synchronous routine 116 can fetch execution results 122 from cache 110. As indicate by the double arrows connecting cache 110 and sync-over-async wrapper 114, fetching execution results can comprise two-directional communication involving one or more of asynchronous operation 104, cache 110, completion handler 106, sync-over-async wrapper 114 or synchronous routine 116. Because synchronous operation 116 is unblocked (active), any memory accessible only when operation 116 is unblocked is available for storing execution results 122. Similarly, any marshaling that requires participation of synchronous routine 116 or any other routines executed on the thread that executes synchronous routine 116 can be performed because synchronous routine 116 is not blocked.

In some embodiments, some methods can include one or more acts for configuring a computing environment to handle completion of asynchronous operations, such as an act of encapsulating an asynchronous operation with a wrapper, the wrapper including a completion handler and a state flag. For example, a computing environment can be configured with async wrapper 102, which supplements functionality of asynchronous operation 104. As depicted and discussed, async wrapper 102 can supplement asynchronous operation 104 with state flag 108 and completion handler 106.

State flag 108 can be configured to store one of (i) a first value indicating that asynchronous operation 104 was called truly asynchronously, and (ii) a second value indicating that asynchronous operation 105 was called by a sync-over-async wrapper that blocks awaiting completion of the asynchronous operation.

Completion handler 106 can be configured to execute upon completion of asynchronous operation 104 and to provide results of the asynchronous operation to a thread utilizing the results of the asynchronous operation. In particular, when state flag 108 stores the first value (corresponding to a truly asynchronous calling context), completion handler 106 can be configured to marshal the results to a thread configured to process the results of the asynchronous operation, such as async-aware routine 112. The thread processing the results of the asynchronous operation may participate in marshaling the results because it is not blocked awaiting the completion of the asynchronous operation. Alternatively, when state flag 108 stores the second value (corresponding to a synchronous calling context), completion handler 106 can be configured to store the results at a location accessible to the calling thread (e.g., cache 110) and to notify the calling thread that the asynchronous operation has completed. After receiving the notification that the asynchronous operation has completed and after unblocking, the calling thread may participate in marshalling of the results of the asynchronous operation because it is no longer blocked.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, implemented at a computer system that includes one or more processors and system memory, the method for handling completion of an asynchronous operation, the method comprising:
   an act of an async wrapper receiving a request to execute an asynchronous operation from a calling context, the async wrapper comprising a wrapper for the asynchronous operation and being configured to execute the asynchronous operation on behalf of the calling context;
   an act of the async wrapper setting a state flag, including:
      based on determining that the request originated from an asynchronous routine, setting the state flag to a first state; and
      based on determining that the request originated from a sync-over-async wrapper which is awaiting a notification that the asynchronous operation has completed, setting the state flag to a second state;
   an act of the async wrapper initiating execution of the asynchronous operation;
   an act of the async wrapper detecting completion of the asynchronous operation; and
   based on the state flag, an act of the async wrapper providing results of the asynchronous operation to the calling context, including:
   when the state flag indicates the first state:
   an act of the async wrapper marshaling results of the asynchronous operation to the asynchronous routine; and
   when the state flag indicates the second state:
   an act of the async wrapper storing results of the asynchronous operation at a particular location that is accessible by both the async wrapper and the synchronous routine, the particular location being accessible by the async wrapper even though the synchronous routine is blocked; and
   an act of the async wrapper signaling completion of the asynchronous operation to the sync-over-async wrapper, resulting in the synchronous routine unblocking and retrieving the stored results from the particular location.

2. The method as recited in claim 1, wherein the act of the async wrapper signaling completion of the asynchronous operation to the sync-over-async wrapper comprises an act of the async wrapper identifying the particular location from where the results of the completed asynchronous operation may be retrieved.

3. The method as recited in claim 1, wherein the act of the async wrapper marshaling results of the asynchronous operation to the asynchronous routine comprises the async wrapper communicating bi-directionally with a thread corresponding to the asynchronous routine.

4. The method as recited in claim 1, wherein the request includes an indication that execution of the asynchronous operation is being requested by the sync-over-async wrapper.

5. The method as recited in claim 1, further comprising:
an act of the async wrapper receiving a request from the sync-over-async wrapper for retrieving the results from the particular location; and
an act of the async wrapper communicating the results from the particular location to the sync-over-async wrapper.

6. The method as recited in claim 1, wherein the state flag stores a boolean value.

7. One or more computer readable devices, excluding signals, having stored thereon computer-executable instructions that, when executed by one or more processors of a computer system, cause the computer system to handle completion of an asynchronous operation, including at least the following:
an async wrapper receiving a request to execute an asynchronous operation from a calling context, the async wrapper comprising a wrapper for the asynchronous operation and being configured to execute the asynchronous operation on behalf of the calling context;
the async wrapper setting a state flag, including:
based on determining that the request originated from an asynchronous routine, setting the state flag to a first state; and
based on determining that the request originated from a sync-over-async wrapper which is awaiting a notification that the asynchronous operation has completed, setting the state flag to a second state;
the async wrapper initiating execution of the asynchronous operation;
the async wrapper detecting completion of the asynchronous operation; and
based on the state flag, the async wrapper providing results of the asynchronous operation to the calling context, including:
when the state flag indicates the first state:
the async wrapper marshaling results of the asynchronous operation to the asynchronous routine; and
when the state flag indicates the second state:
the async wrapper storing results of the asynchronous operation at a particular location that is accessible by both the async wrapper and the synchronous routine, the particular location being accessible by the async wrapper even though the synchronous routine is blocked; and
the async wrapper signaling completion of the asynchronous operation to the sync-over-async wrapper, resulting in the synchronous routine unblocking and retrieving the stored results from the particular location.

8. The one or more computer readable devices as recited in claim 7, wherein the async wrapper signaling completion of the asynchronous operation to the sync-over-async wrapper comprises the async wrapper identifying the particular location from where the results of the completed asynchronous operation may be retrieved.

9. The one or more computer readable devices as recited in claim 7, wherein the async wrapper marshaling results of the asynchronous operation to the asynchronous routine comprises the async wrapper communicating bi-directionally with a thread corresponding to the asynchronous routine.

10. The one or more computer readable devices as recited in claim 7, wherein the request includes an indication that execution of the asynchronous operation is being requested by the sync-over-async wrapper.

11. The one or more computer readable devices as recited in claim 7, further including:
the async wrapper receiving a request from the sync-over-async wrapper for retrieving the results from the particular location; and
the async wrapper communicating the results from the particular location to the sync-over-async wrapper.

12. The one or more computer readable devices as recited in claim 7, wherein the state flag stores a boolean value.

13. A computer system, comprising:
one or more processors; and
one or more computer-readable media having stored thereon computer-executable instructions that, when executed by the one or more processors, cause the computer system to handle completion of an asynchronous operation, including at least the following:
receiving, at an async wrapper, a request to execute an asynchronous operation from a calling context, the async wrapper comprising a wrapper for the asynchronous operation and being configured to execute the asynchronous operation on behalf of the calling context;
setting, by the async wrapper, a state flag, including:
based on determining that the request originated from an asynchronous routine, setting the state flag to a first state; and
based on determining that the request originated from a sync-over-async wrapper which is awaiting a notification that the asynchronous operation has completed, setting the state flag to a second state;
initiating, by the async wrapper, execution of the asynchronous operation;
detecting, at the async wrapper, completion of the asynchronous operation; and
based on the state flag, the async wrapper providing results of the asynchronous operation to the calling context, including:
when the state flag indicates the first state:
the async wrapper marshaling results of the asynchronous operation to the asynchronous routine; and
when the state flag indicates the second state:
the async wrapper storing results of the asynchronous operation at a particular location that is accessible by both the async wrapper and the synchronous routine, the particular location being accessible by the async wrapper even though the synchronous routine is blocked; and
the async wrapper signaling completion of the asynchronous operation to the sync-over-async wrapper, resulting in the synchronous routine unblocking and retrieving the stored results from the particular location.

14. The computer system as recited in claim 13, wherein the request includes an indication that execution of the asynchronous operation is being requested by the sync-over-async wrapper.

15. The computer system as recited in claim 13, further including:
the async wrapper receiving a request from the sync-over-async wrapper for retrieving the results from the particular location; and
the async wrapper communicating the results from the particular location to the sync-over-async wrapper.

* * * * *